Sept. 13, 1955 F. L. DAVIS 2,717,524
CONSTANT SPEED TRANSMISSIONS
Filed July 29, 1952 2 Sheets-Sheet 1
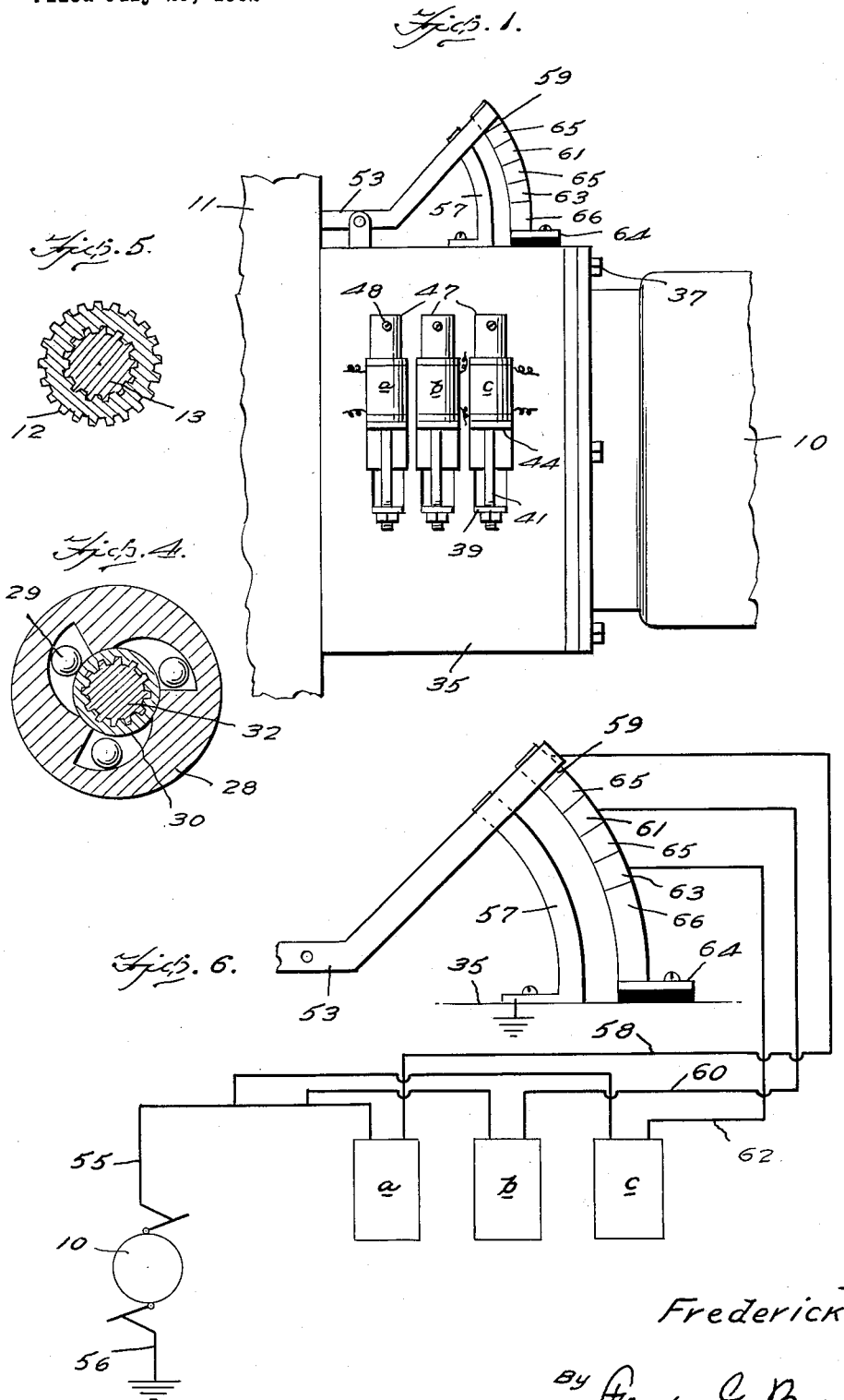
Inventor
Frederick L. Davis
By Francis G. Boswell
ATTY

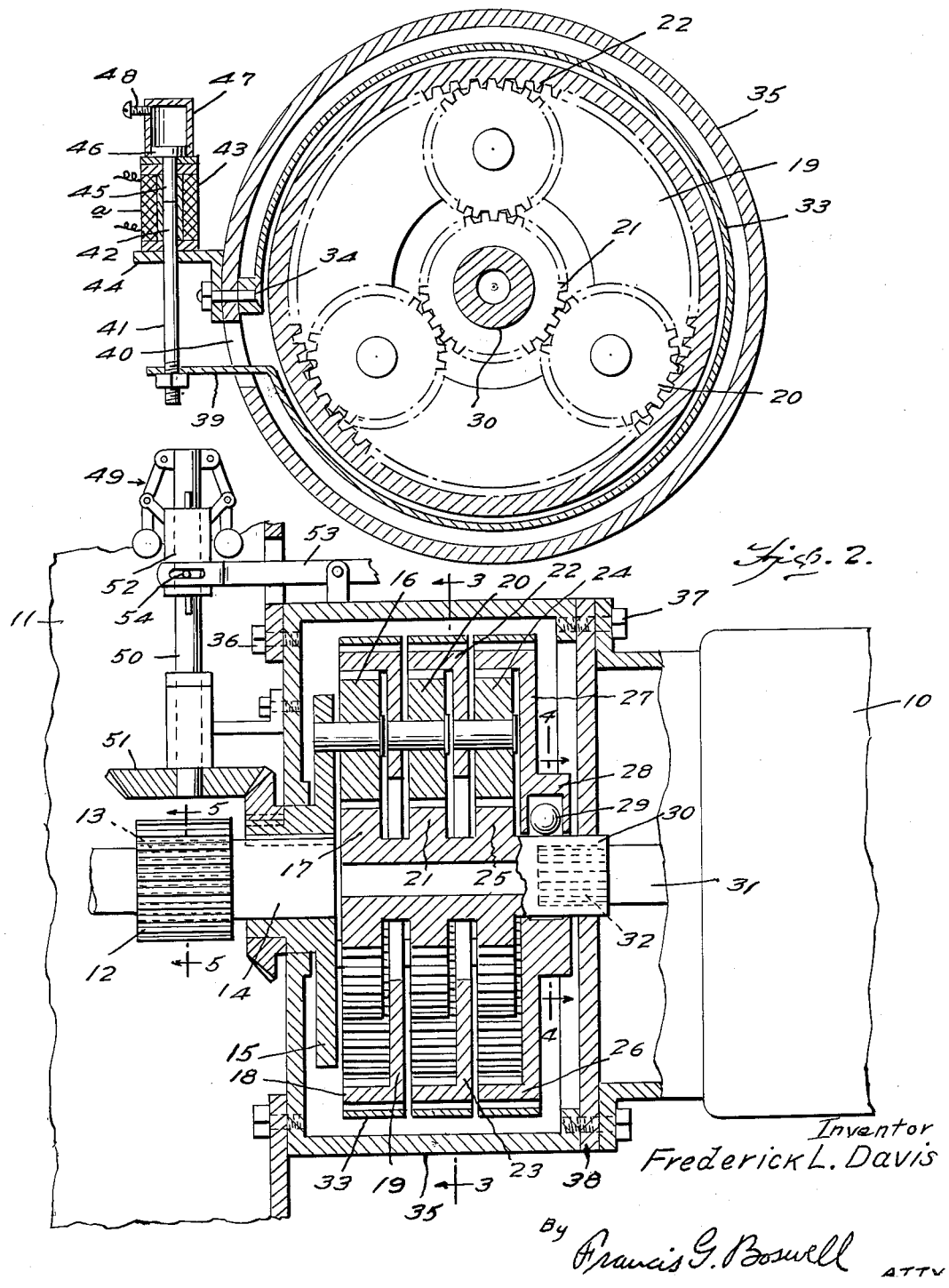

United States Patent Office 2,717,524
Patented Sept. 13, 1955

2,717,524

CONSTANT SPEED TRANSMISSIONS

Frederick L. Davis, Fayetteville, N. C.

Application July 29, 1952, Serial No. 301,450

5 Claims. (Cl. 74—752)

The object of the invention is to provide a transmission for inter-position between driving and driven members whereby the latter will be maintained at a constant speed, or substantially at a constant speed, despite variations in the speed of the former; to provide a transmission of this character which is particularly adapted for use on vehicles as a means to keep the generator speed at normal despite variations of the motor speed from idling to maximum speed; to provide a mechanism of this character which may be readily interposed between the generator and the motor and support the former while being itself supported by the latter; to provide a constant speed mechanism in which the speed relation between the input and output ends is governor-controlled from the vehicle motor; and generally to provide a device of the kind described which is of simple form, of a character to be utilized with conventional vehicles without modification of the latter and which, for the functions to be performed, is susceptible of comparatively cheap manufacture.

With this object in view, the invention consists in a construction and combination of parts of which a preferred embodiment is illustrated in the accompanying drawings, wherein:

Figure 1 is a side elevational view of the invention;

Figure 2 is a diametrical sectional view of the same;

Figure 3 is a sectional view on the plane indicated by the line 3—3 of Figure 2;

Figure 4 is a sectional view on the plane indicated by the line 4—4 of Figure 2;

Figure 5 is a sectional view on the plane indicated by the line 5—5 of Figure 2;

Figure 6 is a diagrammatic view showing the wiring diagram for actuation of the brake or arresting bands for the ring gears.

Conventionally, in certain classes of vehicles, the generator 10 is mounted on the vehicle motor 11 and is directly driven thereby through the instrumentality of a gear 12 which is of ring form and broached to provide interior teeth which engage between the teeth of the gear 13 which is at the input end of the transmission constituting the present invention. The gear 13 is carried by a stub shaft 14 to which is attached a planetary gear plate 15 on which are mounted the planetary gears 16. These gears mesh with the sun gear 17 and with the ring gear 18 in surrounding relation to the planetary gears. Formed as part of the ring gear 18 is a planetary gear plate 19 on which are mounted the planetary gears 20 which mesh with the sun gear 21 and with the ring gear 22, this latter being formed with a planetary gear plate 23 carrying the planetary gears 24 which mesh with a third sun gear 25 and with a ring gear 26, this last being formed as part of a plate 27 which at its center carries a driving element 28 of an overrunning clutch of the ball type and having the balls 29 bearing on the periphery of the driven member 30 with which the sun gears 17, 21 and 25 are integral parts. The driven member 30 is in the form of a tubular shaft and at the output end of the transmission receives the generator shaft 31 whose gear 32 which previously was received in the gear 12 is received in the broached teeth of the driven member.

The speed differential between the input and output ends of the transmission is determined by which of the ring gears is arrested or prevented from rotation. Considering the ring gear 18 to be held against rotation, the driven 30 will have its greatest angular movement for a given speed of the vehicle motor. If the ring gear 22 be arrested or prevented from movement, the speed of the driven shaft 31 will still exceed the motor speed but be less than that when the ring 18 is arrested. If the ring gear 26 is arrested, the speed of the driven shaft 31 will still exceed that of the driver but will be less than the speed resulting from arresting the ring gears 18 or 22. If all of the ring gears be unrestrained, the overrunning clutch will be effective to lock the driven 30 with respect to the gear 26 and then the whole system of gears will rotate bodily and the speed of the driven shaft will be approximately that of the driver 14 or its gear 12 which is a part thereof.

The invention contemplates automatic means for restraining the ring gears and in each instance this means constitutes a brake band 33 having one end anchored at 34 in the case 35, the latter enclosing all of the gears and their attendant parts and being bolted at one side, as at 36, to the motor casing and at the other side, as indicated at 37, to the generator casing, the casing at the output end having a removable cover plate 38. That end of the brake band remote from the anchored end is provided with a terminal arm 39 which extends through a slot 40 in the case and is terminally engaged with a pull bar 41, the latter being part of the core 42 of the solenoid 43, mounted on a bracket 44 on the case 35. The solenoid core 42 is of course of magnetic material so that in normal position with the brake band released, its upper end will be substantially midway between the ends of the solenoid. But this core is continued with an extension 45 of non-magnetic material terminally equipped with a piston 46 within a cylinder 47 which surmounts the solenoid and which has an adjustable airport controlled by a valve 48. The cylinder acts as a dashpot to prevent too quick operation of the solenoid in tightening the brake band around the ring gear. Of course, the operation should be reasonably fast, but it nevertheless, to be practical, must be somewhat slower than would be the case were the core movement to be unrestrained.

Each of the ring gears is subject to restraint by the operation of the brake band such as that above described, and means for causing the brake bands to be successively operated consists in part of a vehicle motor actuated governor 49 at the outer end of a shaft 50 driven from the vehicle motor through a miter gear couple 51 of which the driver member is mounted on the stub shaft 14 and the driven member on the shaft 50. The ball levers of the governor are operatively connected with and effect longitudinal movement of the sleeve 52 along the shaft 50 and in so doing impart rocking movement to the lever 53 whose forked end straddles the sleeve 52 and has its slots in engagement with a pin 54. The lever 53 is a control lever to effect circuit closing operation on the magnets *a*, *b*, and *c* which are identical but which are respectively the actuating magnets of brake bands associated with the ring gears 18, 22, and 26. Each of these magnets has one terminal connected with the conductor 55 which is led to one terminal of the generator 10 whose other terminal connects, through a conductor 56, with a segment 57. By means of a conductor 58, the one terminal of the solenoid of magnet "*a*" connects with the contact 59, the corresponding terminal of the solenoid "*b*" connecting, by means of a conductor 60, with the contact 61 and the corresponding terminal of the solenoid "*c*" connecting, by means of a conductor 62, with a contact 63. The contacts 59, 61 and 63 are elements of a segment mounted, as at 64, on the case 35. Dead or insulated zones 65 intervene between the contacts 59 and 61 and 61 and 63. The insulated zones are of the same width as the contacts 59, 61 etc., so that when the lever 53 leaves one contact at about the time it enters another. A dead or insulated zone 66 is provided near the bottom of the segment and in this the outer end of the lever lies when the motor is running at full speed and none of the brake bands are operative to restrain the ring gears.

The segment embodying the contacts 59, 61, etc. is insulated from the casing while the segment 57 is non-insulated from but mounted on the casing.

Assuming the transmission to be mounted on and to be driven from the vehicle motor and in turn driving a generator, as aforesaid, and assuming further that the motor is idling, then the governor shaft 50 will be rotating at its lower speed and the governor balls will bring the sleeve 52 in the position where the contact arm will bridge the segment 57 and the contact 59. Then the solenoid "*a*" will be placed in circuit, as indicated in Figure 6, deriving current either from the generator or the battery, and the brake band on the ring gear 18 will be tightened to arrest that gear, then the remaining ring gears will rotate left-handedly, assuming the direction of rotation of the stub shaft 14 to be right-handed as is customarily the case, and the sun gears will rotate right-handedly and at a greater speed than the stub shaft 14. As the driving motor accelerates the governor balls will operate to elevate the sleeve 52 and cause it to move the switch lever 53 into engagement with the contact 61, when the solenoid "*b*" will be placed in circuit and its attendant brake band engaged with the ring gear 22 to arrest it. Then the ring gears 18 and 26 will rotate left-handedly with the result that the speed of the sun gears will drop off as respects the driving shaft's speed, so that the driven member 30 will, with the increased vehicle motor speed, move at the same speed as formerly. As the driving motor further accelerates and the governor further operates the switch lever 53, the latter will be brought into engagement with the contact 63 and the solenoid will be energized to brake the ring gear 26, when the relative speeds of the sun gears and the stub shaft 14 will more nearly approach equality. Finally, when the full speed of the driving motor is attained, the governor will have shifted the switch arm onto the dead segment 66, thus releasing the brake band on the ring gear 26 and allowing the whole system of gears to operate, when the ball or overriding clutch will begin to function and the driven shaft 31 is moving at approximately the same speed as the driver 14 is moving.

It will thus be seen that as the engine speed varies within limits, the speed of the driven shaft 31 is regulated accordingly, so that the driven element, the generator 10, will be maintained at approximately constant speed and therefore have practically a constant output voltage.

The invention having been described, what is claimed as new and useful is:

1. A constant speed transmission for use in motor vehicles to maintain constant generator output despite speed variations in the vehicle motor, the same comprising a concatenated series of planetary gears, sun gears, and ring gears, of which the planetary gears are in mesh with the sun gears and the ring gears in surrounding relation to and in mesh with the planetary gears, driving means for operatively connecting the initial set of planetary gears with the vehicle motor, brake bands in surrounding relation to the ring gears, and means driven by and controlled by the speed of the vehicle motor for successively actuating the brake bands to arrest rotation of the ring gears, the sun gears being fixedly connected with the generator, and the terminal ring gear having a releasable driving connection with the generator.

2. A constant speed transmission for use in motor vehicles to maintain constant generator output despite speed variations in the vehicle motor, the same comprising a concatenated series of planetary gears, sun gears, and ring gears, of which the planetary gears are in mesh with the sun gears and the ring gears in surrounding relation to and in mesh with the planetary gears, driving means for operatively connecting the initial set of planetary gears with the vehicle motor, brake bands in surrounding relation to the ring gears, and means driven by and controlled by the speed of the vehicle motor for successively actuating the brake bands to arrest rotation of the ring gears, the sun gears being fixedly connected with the generator, and an overrunning clutch operatively connecting the terminal ring gear with the generator and operative to clutching position only when the angular speed of the generator tends to exceed the angular speed of the ring gear.

3. A constant speed transmission for use in motor vehicles to maintain constant generator output despite speed variations in the vehicle motor, the same comprising a concatenated series of planetary gears, sun gears, and ring gears, of which the planetary gears are in mesh with the sun gears and the ring gears in surrounding relation to and in mesh with the planetary gears, driving means for operatively connecting the initial set of planetary gears with the vehicle motor, brake bands in surrounding relation to the ring gears, solenoids operatively connected with the brake bands to move them to gripping positions when energized, conductors connecting the solenoids to the generator, a switch having a pivotally mounted arm moving over a series of contacts to successively connect in circuit the solenoids of successive brake bands so as to bring them into gripping position with the ring gears, and a governor operatively connected with the driving means and itself operatively connected with the switch arm to move the latter to one or the other of said contacts depending on the speed of the governor.

4. A constant speed transmission for use in motor vehicles to maintain constant generator output despite speed variations in the vehicle motor, the same comprising a concatenated series of planetary gears, sun gears, and ring gears, of which the planetary gears are in mesh with the sun gears and the ring gears in surrounding relation to and in mesh with the planetary gears, driving means for operatively connecting the initial set of planetary gears with the vehicle motor, brake bands in surrounding relation to the ring gears, solenoids operatively connected with the brake bands to move them to gripping positions when energized, conductors connecting the solenoids to the generator, a switch interposed in said conductors and having a pivotally mounted arm moving over a series of contacts to successively connect in circuit the solenoids of successive brake bands so as to bring them into gripping position with the ring gears, and a governor operatively connected with the driving means and itself operatively connected with the switch arm to move the latter to one or the other of said contacts depending on the speed of the governor, all of the solenoids having their cores operatively connected at one end with the brake bands and at their other ends with dashpots to arrest too quick action of the cores.

5. A constant speed transmission for use in motor vehicles to maintain constant generator output despite speed variations in the vehicle motor, the same comprising a concatenated series of planetary gears, sun gears, and ring gears, of which the planetary gears are in mesh with the sun gears and the ring gears in surrounding relation to and in mesh with the planetary gears, driving means for operatively connecting the initial set of planetary gears with the vehicle motor, brake bands in surrounding relation to the ring gears, solenoids operatively connected with the brake bands to move them to gripping positions when energized, conductors connecting the solenoids to the generator, a switch interposed in said conductors and having a pivotally mounted arm moving over a series of contacts to successively connect in circuit the solenoids of successive brake bands so as to bring them into gripping position with the ring gears, and a governor operatively connected with the driving means and itself operatively connected with the switch arm to move the latter to one or the other of said contacts depending on the speed of the governor, all of the solenoids having their cores operatively connected at one end with the brake bands and at their other ends with dashpots to arrest too quick action of the cores, the dashpots consisting of cylinders surmounting the solenoids and provided with adjustable ports and the cores having pistons movable in said cylinders.

References Cited in the file of this patent

UNITED STATES PATENTS

| | | |
|---|---|---|
| 1,447,837 | De Normanville | Mar. 6, 1923 |
| 1,794,357 | Barton et al. | Mar. 3, 1931 |
| 1,839,145 | Forichon | Dec. 29, 1931 |
| 1,949,203 | Havill | Feb. 27, 1934 |
| 2,208,224 | Murray | July 16, 1940 |
| 2,266,164 | Claytor | Dec. 16, 1941 |
| 2,375,785 | Goode et al. | May 15, 1945 |
| 2,516,059 | Lanphere | July 18, 1950 |

FOREIGN PATENTS

| | | |
|---|---|---|
| 684,774 | France | Mar. 24, 1930 |